Figure 1:
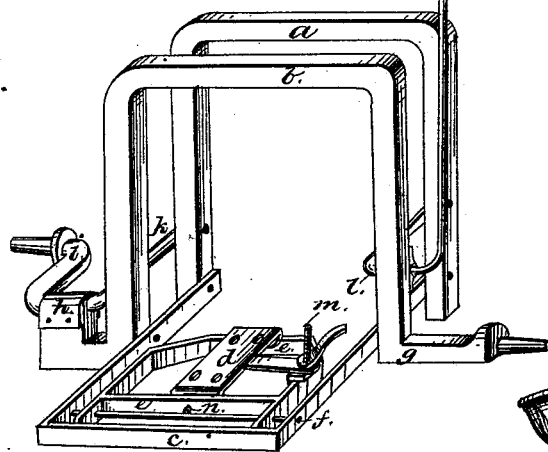
Figure 2:
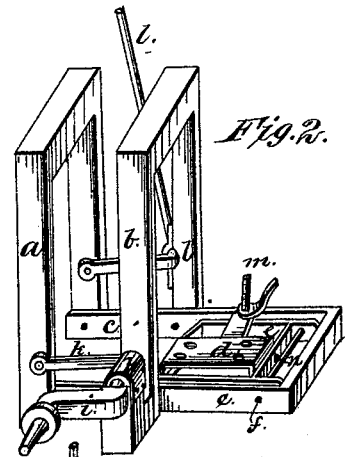
Figure 3:
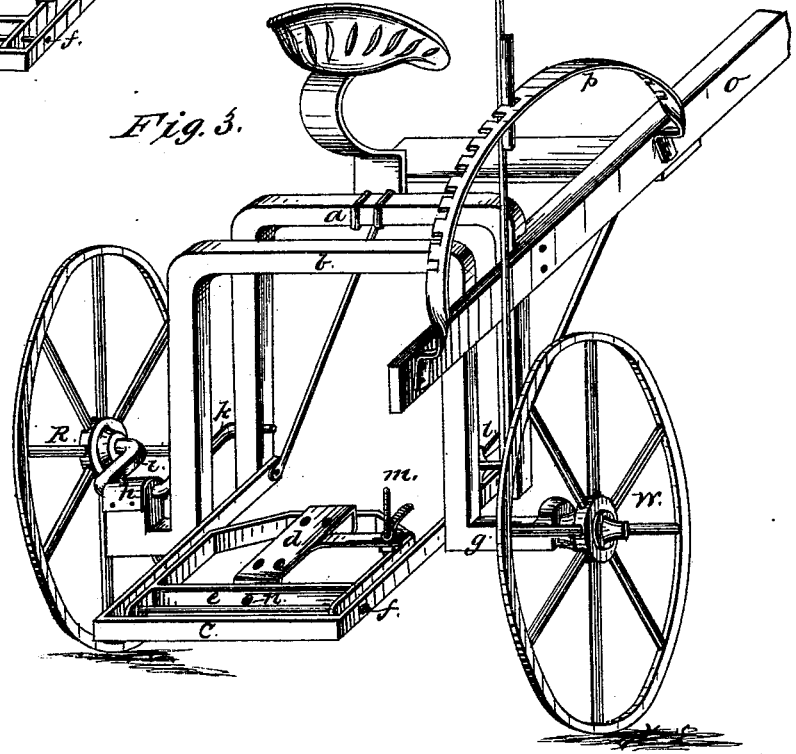

H. J. SCHMEISER.
SULKY-PLOW.

No. 185,972. Patented Jan. 2, 1877.

Witnesses:
Sophus Holsteen
Jacob Schmeiser

Inventor:
Henry Jacob Schmeiser

UNITED STATES PATENT OFFICE.

HENRY J. SCHMEISER, OF BURLINGTON, ASSIGNOR OF ONE-HALF HIS RIGHT TO JACOB SCHMEISER, OF DES MOINES COUNTY, IOWA.

IMPROVEMENT IN SULKY-PLOWS.

Specification forming part of Letters Patent No. 185,972, dated January 2, 1877; application filed October 20, 1876.

*To all whom it may concern:*

Be it known that I, HENRY JACOB SCHMEISER, of the city of Burlington, in the county of Des Moines and State of Iowa, have made a new and useful invention in the shape of a Double-Action-Frame Plow-Sulky, a description of which is fully set forth in the following specification, reference being had to the accompanying drawings.

The object of my invention is to render the operation of plowing the soil less laborious for the plowman, and at the same time perform it with more accuracy, uniformity, and thoroughness.

The double-action-frame plow-sulky is made of two upright wrought-iron frames, $a$ and $b$, a horizontal wrought-iron frame, $c$, which is attached with its open ends to the inside of the lower ends of the said frames $a$ and $b$, as shown in the accompanying drawings, so that it easily moves upon the bolts which hold it, and a fourth wrought-iron frame, $e$, which swings upon an iron rod, $f$, running through the frame $c$ near its closed end. Within the frame $e$ and moving upon an iron rod running lengthwise through the center of the said frame, is an adjustable iron plate, $d$, with four holes to receive the clamps which hold the beam of the plow and shank, whose end has a slot, which is passed over the perpendicular screw $m$, fastened to one side of the frame $e$, and raised or lowered upon this screw, at the pleasure of the operator, by one nut underneath and one nut above the said end of the shank. A strong spring is fastened to the top of the frame $a$, which spring supports a seat for the driver, and to one side, near the upper corner of this frame $a$, the tongue $o$ is firmly bolted. The rear end of this tongue extends behind the frame $b$, but that part of it is cut down to only one-half its thickness, so as to not come in contact with the said frame $b$. The frame $b$ ends on one side in an axle, $g$, upon which the wheel $w$ is put, and on the other side ends in a bearing with a cap, $h$. Upon this bearing, and held in place by the cap $h$, moves a crank-shaped axle, $i$, which enters the wheel R, and whose shank $k$ moves at its extreme end upon a bolt fastened to the frame $a$. On the other side of the frame $b$ a lever, $l$, is attached, whose short shank runs forward, and moves with its end upon a bolt fastened to the frame $a$, and whose longest shank runs upward to within easy reach of the driver when on the seat, and is held in position by the notched iron bow $p$, fastened with both ends to the tongue $o$.

In using the plow-sulky, any common plow which the operator may consider best for the soil he is going to work (so it is of modern construction, and those with an iron or steel beam are preferable) is fastened upon the plate $d$ by putting two clamps over its beam, and through the holes of the plate, so that the clevis projects forward beyond the plate and the frame $e$. The operator then adjusts the plate $d$ by setting its shank higher or lower on the screw $m$, according to the surface of the ground and the amount of land he wants the plow to take, hitches the draft-animals by the usual means to the clevis of the plow, mounts the seat, with his feet on the foot-board fastened to the lower side of the tongue, and further strengthened by braces, and, by moving the lever $l$ backward, throws the plow into the ground an inch to every notch, and in the same proportion that the plow goes into the soil the wheel R is raised by the operation of the crank-shaped axle, so as to avoid straining.

By moving the lever $l$ forward the driver throws the plow out of the ground. It requires but very little strength to work the plow into or out of the soil by means of the lever, as the weight of the operator and the tongue, which both press upon the frame $a$, goes far toward balancing the weight of the plow, which presses near the closed end on the frame $c$.

I claim as my invention—

The combination of the frames $a\ b\ c\ e$ and the adjustable plate $d$, substantially as described.

HENRY JACOB SCHMEISER.

Witnesses:
SOPHUS HOLSTEEN,
H. C. OHRT.